United States Patent [19]

Ross

[11] E Re. 28,458

[45] Reissued July 1, 1975

[54] APPARATUS AND METHOD OF FILTERING SOLIDS FROM A LIQUID EFFLUENT

[75] Inventor: David S. Ross, Lorain, Ohio

[73] Assignee: Hydro-Clear Corporation, Avon Lake, Ohio

[22] Filed: Feb. 9, 1973

[21] Appl. No.: 331,001

Related U.S. Patent Documents

Reissue of:

[64] Patent No.: 3,459,302
Issued: Aug. 5, 1969
Appl. No.: 633,458
Filed: Apr. 25, 1967

[52] U.S. Cl. ..... 210/80; 210/193; 210/274; 210/276; 210/293; 210/416

[51] Int. Cl. ..... B01d 23/24

[58] Field of Search ..... 210/80, 82, 275–279, 210/193, 269, 273, 274, 280, 291, 293, 416, 499

[56] References Cited

UNITED STATES PATENTS

| | | | |
|---|---|---|---|
| 402,147 | 4/1889 | Denison | 210/416 X |
| 630,988 | 8/1889 | Reiseat | 210/274 X |
| 644,531 | 2/1900 | Morton | 210/275 X |
| 667,005 | 1/1901 | Davis | 210/293 |
| 1,195,923 | 8/1916 | Gans | 210/276 |
| 1,750,879 | 3/1930 | Markus et al. | 210/278 X |
| 2,108,168 | 2/1938 | Jenks | 210/82 X |
| 2,237,711 | 4/1941 | Morgan | 210/275 X |
| 2,302,450 | 11/1942 | Laughlin | 210/275 X |
| 2,538,340 | 1/1951 | Tomek et al. | 210/80 |
| 2,723,761 | 11/1955 | Made et al. | 210/274 X |
| 3,064,816 | 11/1962 | Griswold | 210/193 X |
| 3,111,486 | 11/1963 | Soriente | 210/275 X |
| 3,134,735 | 5/1964 | Greenleaf | 210/275 X |
| 3,260,366 | 7/1966 | Duff et al. | 210/277 X |
| 3,282,432 | 11/1966 | Greenleaf | 210/275 X |

*Primary Examiner*—John Adee
*Attorney, Agent, or Firm*—Meyer, Tilberry & Body

[57] ABSTRACT

An apparatus and method of filtering solids from a liquid effluent wherein a sand filter having a single grade granular media is used having agitation of the effluent above the filter media surface at a rate to lift solids from the media surface and means for periodically backwashing clear effluents through the filter at a controlled rate which is not dependent upon the rate that a discharge system can receive the backwashing effluent. A trough is placed above the filter to [ accepts ] *accept* the backwash effluent upon its passing through the filter in the reverse direction.

6 Claims, 16 Drawing Figures

INVENTOR.
DAVID S. ROSS

BY
Mayer, Tilberry & Body
ATTORNEYS.

INVENTOR.
DAVID S. ROSS

BY
Meyer, Tilberry & Body
ATTORNEYS.

INVENTOR.
DAVID S. ROSS
BY
Meyer, Tilberry & Body
ATTORNEYS.

INVENTOR.
DAVID S. ROSS
BY
Meyer, Tilberry & Body
ATTORNEYS.

INVENTOR.
DAVID S. ROSS

BY
Meyer, Tilberry & Body
ATTORNEYS.

INVENTOR.
DAVID S. ROSS

BY
Meyer, Tilberry & Body
ATTORNEYS.

APPARATUS AND METHOD OF FILTERING SOLIDS FROM A LIQUID EFFLUENT

Matter enclosed in heavy brackets [ ] appears in the original patent but forms no part of this reissue specification; matter printed in italics indicates the additions made by reissue.

---

The present invention pertains to the art of filtering solids from liquid effluents and more particularly to an apparatus and method of filtering solids from a liquid effluent.

The present invention is particularly applicable for filtering solids from an effluent which has been previously treated before the effluent is discharged into a stream or similar repository, and it will be described with particular reference thereto; however, it will be appreciated that the invention has much broader applications and may be used in various installations requiring the removal of solid particles having various physical characteristics from a waste liquid material.

It is quite well known that a liquid effluent which is discharged from a waste treatment installation has a highly variable quality. This quality of the effluent is affected by many factors generally beyond the control of the process or equipment basically used in treating waste effluent. For this reason, many waste treatment processes and equipment, even though operated properly, discharge effluents having characteristics not suited for discharge into streams, lakes, and other bodies of water for recharging into soil, or for subsequent use. Consequently, many sewage and industrial installations for treating waste liquid discharge an effluent which is unacceptable under present day standards.

Of course, various methods have been proposed for protecting the water of streams and lakes; however, most of these prior arrangements have been relatively expensive, difficult to maintain, and required substantial amounts of land. Often, the odor, maintenance and space required for treatment of effluent has created a condition which may be more undesirable than the original effluent.

In some instances, apparatus and method for treating waste effluent has included a subsequent sand filter for removing residual solids. However, these sand filters have not been successful due to such things as clogging of the filter media which requires constant attention. In an attempt to reduce the necessary maintenance of sand filters, they have been constructed with relatively large surface areas to increase the interval between successive clogging. This did not correct the problem because the large area of the sand filters ultimately became clogged and had to be cleaned or replaced to restore the filter to an operating condition. The sand filters at the terminal end of a processing installation accumulated a large quantity of solids, which included substances that are biologically unstable. This created a nuisance at the sand filter because of the attraction of flies and other insects and the creation of excessive offensive and sometimes harmful odors. For this reason, among others, sand filters have proven to be unsuccessful at the terminal end of a waste treatment installation.

One method to overcome the disadvantages of certain sand filter installations has been to provide a large pond into which the effluent would be discharged and detained. These ponds required a relatively large land area which, by necessity, should be isolated. In addition, nutrients for plant life contained in the effluent caused rapid growth of algae. This algae growth in the pond ultimately resulted in an increase in the solids within the pond and an ultimate increase in solids and Biochemical Oxygen Demand of the pond effluent. Consequently, a further increase in the pollution of the receiving body of water was caused.

As mentioned before, prior attempts to use slow sand filters, rapid sand filters, pressure sand filters, pressure or gravity diatomaceous earth filters have proven unsuccessful due to rapid clogging of the filter media and insufficient mechanisms and processes for cleaning the filters at an economical and rapid rate. This observation is relatively important with respect to the present invention because the present invention relates to an improved filtering process utilizing a sand filter without the disadvantages previously posed by sand filters in general.

The waste effluent of most treatment installations contain finely divided suspended solids, colloidal materials, biological degradable solids and other deleterious solid materials. The concentration of these solids is not fixed, particularly in systems utilizing processes in the aerobic spectrum. In an aerobic system, solid concentrations are highly variable for many reasons. This results primarily from the periodic discharge of large quantities of floc by sloughing. This floc imparts a high Biochemical Oxygen Demand on the effluent and may settle in the stream or body of water to which the effluent is discharged, which creates sludge beds with the resulting nuisance. This floc also tends to reduce the oxygen content of a receiving body of water which hampers the life of game fish.

In an attempt to utilize washable or rechargable filters as a subsequent process for a waste treatment installation, one disadvantage was pronounced. High filtering loads were created by the periodic, high sloughing rates of the sludge particles which caused an immediate clogging of the filter to which the effluent was applied. Upon rewashing or recharging of the filter, immediate reclogging would result by the inward flow of the solid material contained in newly received effluent. In other words, the recharging or rewashing of the filter removes the particles within the filter media and the solid material directly above the filter media; however, an immediate reclogging of the filter upon completion of the rewash or recharging cycle is caused by immediately subjecting the filter to large particles which coat the upper surface.

All of these disadvantages of prior subsequent filtering processes are completely overcome by the present invention which is directed toward a relatively simple, highly efficient sand filtering process which may be adapted for use at the terminal portion of many waste treating installations to provide a discharge effluent hereinafter referred to as a "filtrate," which is clear and safe to introduce into natural bodies of water.

In accordance with the present invention, there is provided an apparatus for removing solids from waste liquor effluent. This apparatus comprises a filter tank having a lower wall, a support element covering the lower wall and spaced upwardly therefrom to define a lower chamber, a fine mesh filter element secured onto the support element and having openings of a given size. A layer of particulate filter media covers the fine mesh filtering element and has an upper surface. This media has a grain size, at least slightly larger than the size of the openings in the filter element. The apparatus also includes an effluent inlet above the surface of the media layer and an outlet port in the lower chamber for discharge of clear, filtered liquid.

In accordance with another aspect of the invention, there is provided a sand type filter structure comprising a support element, a fine mesh filter element secured to the support element and having openings of a given size, and a layer of particulate filter media covering the fine mesh filtering element, the media having a grain size at least slightly larger than the size of the openings in the filter element.

In accordance with still a further aspect of the present invention there is provided a method of removing solids from waste liquor effluent. This method comprises the steps of providing a filter having a uniform grain size in a tank; discharging an effluent onto the sand filter whereby the level of the effluent in the tank increases according to the flow rate through the sand filter; maintaining a supply of filtered effluent; and, backwashing the filter with the filtered effluent.

By constructing a filtering installation in accordance with the present invention, an approved process for filtering waste liquor effluents is realized. Waste effluent passes through a media which strains out various particles of a size and a quality dependent upon the effective size and uniformity of the media being used. The waste liquor effluent will, of course, eventually clog the sand media. When the media becomes clogged, the rate of filtration decreases, and the liquor level of the effluent over the media rises. Larger suspended particles, such as floc, covers the upper surface of the sand media and imparts an additional straining action on the liquor by mechanically filtering out particles and further improving the effluent by removing colloidal substances by both an absorption and an adsorption action of the floc. Upon the rise of the liquor effluent above the sand filter, an agitation of the liquor is provided by an auxiliary device. This agitation imparts a velocity to the effluent over the media surface in a direction not generally concurrent with the filtering direction of the effluent. In this manner, the solids, such as floc and other deleterious materials, are lifted from the media surface and are held in suspension thus increasing the amount of time the solids are under the influence of a filtering action. Eventually, even with this agitation and lifting of solids from the filter, the filtering media will become clogged to a physical limit which will require backwashing of the filter to clean the solids therefrom. This backwashing action, forms another aspect of the present invention, and will be described later.

In accordance with the present invention, additional oxygen is provided in the effluent above the filter by impinging the effluent on one or more plates before it moves on to the filter media. This impingement entrains air into the waste effluent and increases the dissolved oxygen content thereof and improves the effluent by offsetting the Biochemical Oxygen Demand of the effluent.

By constructing the apparatus in accordance with the invention, the overall height of the filter media and its support structure may be substantially less than found in conventional rapid sand filters. Also, the construction of a support for the sand filter, which will be explained later, permits effective backwashing of the filter media in a manner to produce generally uniform reverse velocities to the filter media.

As explained before, agitation of the effluent above the filter media surface has certain advantages in that it increases the filtering action of the total installation. This agitation can be assisted by the introduction of additional air or other gas flow to the waste effluent above the media surface. This not only causes agitation, but also increases the oxygen content of the effluent above the media surface. The oxygen reduces tendency of the waste effluent to be odoriferous by biological and chemical action with certain solids in the effluent. In accordance with the preferred embodiment of the present invention, a single graded media is utilized in the filter. This has certain inherent advantages. Most sand filters are constructed of layers of different sized material. Periodically this material must be replaced because the material of the various layers becomes intermixed, especially during backwashing of the filter.

It is also contemplated by the present invention to provide a multiplicity of filtering cells each of which may be substantially identical in configuration and are used concurrently or separately. Consequently, when one cell is being backwashed or regenerated, one or more of the other cells can accommodate the waste effluent for filtering purposes. In addition, the filtering surface is visible to an operator so that he may determine the operation of each filter cell during its use.

In accordance with another aspect of the present invention, the agitating arrangement may be automatically controlled by the level of the effluent within the filtering cell. This eliminates the need for constant and continuing attention to the filtering by an operator. In like manner, automatic backwashing when the effluent level above the media reaches a given height is possible without substantial modification of the preferred embodiment of the present invention.

In the past, it has been found that backwashing of a filter requires a large volume and a high velocity of clear liquid which causes hydraulic loads that cannot be absorbed by normal waste treatment equipment. In accordance with the present invention, the backwashing effluent is deposited in a holding tank where it may be discharged at a controlled rate which is acceptable by subsequent processing equipment. This prevents the discharge of wash water or effluent to sewers, treatment plants or sludge beds at the backwash rate which may be substantially [ greaer ] *greater* than that desirable for the particular repository.

In accordance with a modification of the present invention, the level of effluent may be maintained over the filtering media by a standpipe or similar outlet exterior of the tank in which the filter media is located. In this manner, a minimum, relatively large volume of effluent is maintained over the media surface at all times. This volume of effluent in accordance with this embodiment, is agitated by mechanical means, by diffused air, or by other means to impart a velocity to the effluent above the media in a direction not generally concurrent with the filtering direction through the filter media. The agitation of the effluent provides additional aeration which reduces the Biochemical Oxygen Demand of the effluent passing through the filter cell. When air is used for agitation, the aeration action is substantially increased.

In accordance with still a further modification of the present invention, the surface of the effluent above the filter media is controlled by a device which senses the level of the effluent and controls a filtrate outlet to maintain the level of the effluent above the media within a preselected range. This again provides a maximum amount of effluent above the filter media to provide an enhanced filtering action and an improved aeration of the effluent before it enters the filter media itself.

As is well known, prior equipment to provide a secondary or subsequent treatment of waste effluent, particularly in the aerobic spectrum, removes approximately 85% of the five-day Biochemical Oxygen Demand and approximately 65% of the total suspended solids in the raw waste. The present invention has been found, in use, to be capable of removing substantially 100% of the five-day Biochemical Oxygen Demand and the total suspended solids. This is indicative of the overall efficiency and benefits obtained by use of the present invention as a subsequent waste treatment device.

The present invention is also adapted for use with equipment that will remove bacteria from waste effluents. After the effluent has passed through the media, preferably a relatively fine media, all of the macroscopic and most of the microscopic solids have been removed. The effluent, or filtrate, then flows into a diatomaceous earth media located outside of the filter cell. In this diatomaceous media, the remaining microscopic particles are removed. It is common knowledge that bacteria have a size generally in the range of 1.0–4.0 microns. Commercial diatomite grade of filtering media will filter out particles down to 0.2 micron; however, these filters cannot be economically used without pre-filtering the larger particles from the effluent. For this reason, the diatomaceous earth filter is used in combination with the filter previously described to provide a combined filtering installation which removes even the bacteria from the effluent.

The primary object of the present invention is the provision of an apparatus which will perform the functions outlined above and which is relatively inexpensive and usable with existing waste treatment equipment.

These and other objects and advantages will become apparent from the following description used to illustrate the preferred embodiments of the invention in connection with the accompanying drawings in which:

FIG. 14 is a pictorial side elevational view illustrating, somewhat schematically, a further aspect of the present invention.

Figure 8:
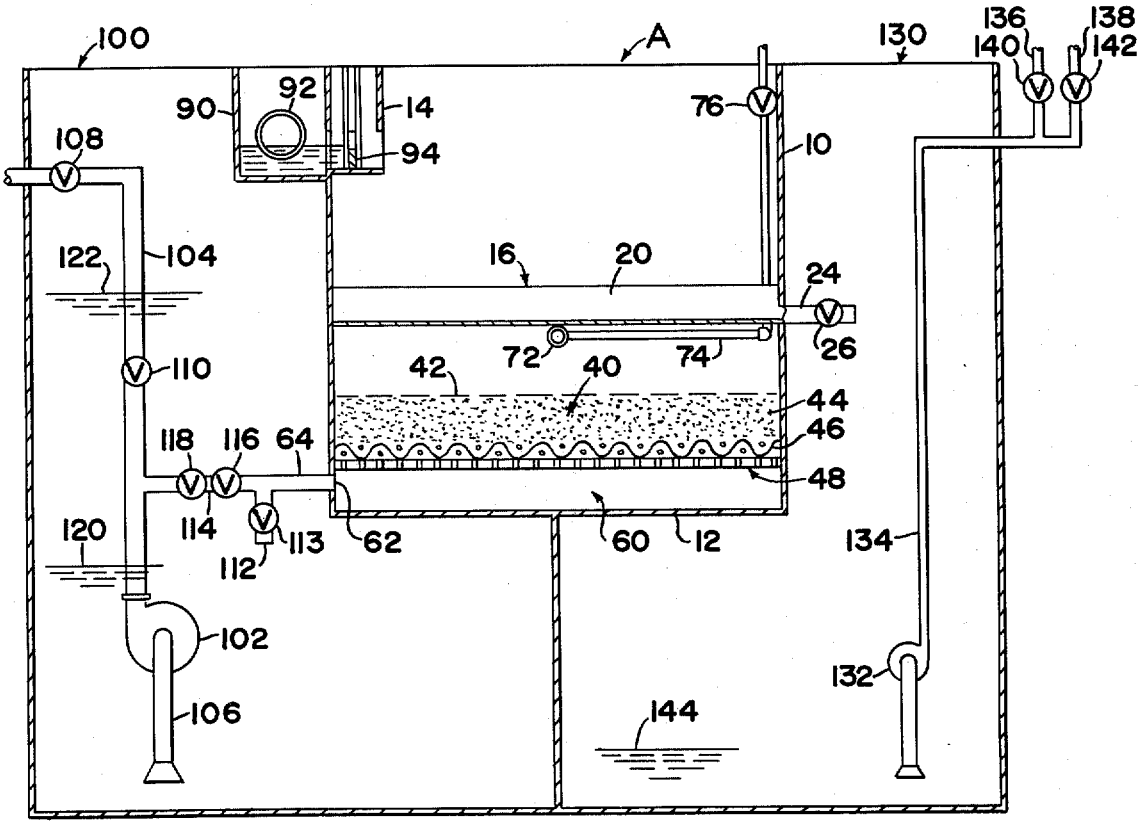
FIG. 8 is a side elevational view showing, somewhat schematically, a further modification of the present invention.

Referring now to the drawings wherein the showings are for the purpose of illustrating preferred embodiments of the invention only and not for the purpose of limiting the same. FIGS. 1–6 and 8 show a filtering cell A constructed in accordance with the present invention. This cell includes a filtering tank 10 having a bottom wall 12 and an inlet, generally designated 14. Extending transversely across the tank there is provided a backwash conduit in the form of a generally U-shape trough 16 having opposed side walls 20, 22. The interior of the trough is communicated with a backwash outlet conduit 24 having an appropriately positioned control valve 26. Directly below the effluent inlet 14 is provided a splash plate 30 against which a stream of effluent 32 impinges to entrap air in the effluent entering the tank 10. The sand filter is designated 40, and it includes an upper filtering surface 42. Referring now more particularly to FIGS. 8 and 14, the sand filter 40 includes finely divided quartz or similar media 44 which has a uniform particulate size. In some instances, media 44 may be activated charcoal, anthrafil, a mixture of asbestos or an ion exchange resin for removal of cations or anions. The particle size, in practice, is approximately 0.7 mm.; however, various particulate sizes may be used. Preferably, the quartz of the material 44 has a grain size approximately in the range of 0.3 mm.–0.7 mm. with a uniformity coefficient generally in the range of 1.5. The quartz 44 is supported upon a fine mesh filter element 46 having relatively small openings. When domestic sewage is being treated, element 46 may be formed from bronze or stainless steel. The openings of this filter element are smaller than the particle size of the quart 44. In practice, the openings are approximately 75% of the particle size of the quartz so that the quartz will not move downwardly through the filtering element 46.

Referring now more particularly to FIG. 14, the quartz and filtering elements are supported upon a structure 48 having transversely extending bars 50 spaced away from wall 12 by numerous stands 52. Hence, fluid flows in both directions through the quartz *44* and filter element 46. [ the ] . *The* filter element is held in place against the support structure by a plurality of peripherally extending clamping elements 54 and transversely extending surface clamping elements 56, only one of which is shown. The filter element 40 is spaced from lower wall 12 to define an under or drain chamber 60 having an outlet or inlet port 62 communicated with an appropriate conduit 64. As shown in FIG. 14, a baffle 66 is placed immediately in front of port 62, which may be vertical or horizontal, to prevent localization of the backwashing action to be explained later.

Referring now to FIGS. 1–6, the effluent goes through filter 40 in the direction indicated by downwardly directed arrows 68. Arrows 70 indicate circulating currents within the effluent above filter 40, which currents provide an increased filtering action, in a manner to be described later. An air diffuser 72 connected onto an inlet 74 having an appropriate valve 76 is positioned above filter 40 and generally perpendicular to trough 16. As air is directed into the tank 10, the air forms bubbles 80 which move upwardly through the effluent and creates the circulating currents indicated by arrows 70. As will be explained later, the effluent has an upper level 82 which rises during the filtering operation and decreases to level 82a in FIG. 5, and level 82b, in FIG. 6, during the backwashing function of the cell A.

Referring now more particularly to FIG. 8, the inlet 14, in practice, includes an inlet channel 90 connected onto a common inlet pipe 92. The inlet pipe 92 interconnects a plurality of cells A so that selective cells may be activated for filtering and for backwashing by appropriate valving on the conduit 92. The variable weir 94 is secured onto channel 90 so that the amount of effluent flowing into the tank 10 varies according to the level of effluent within the channel 90.

To one side, or otherwise spaced from, the cell A [ , ] is provided a clear fluid or filtrate tank 100 in which is located a pump 102 having an outlet conduit 104 and an inlet conduit 106. A normally open valve 108 is used to control outlet flow of clear fluid from the tank 100. This flow then progresses to a stream or other depository. Proper flow is determined by a flow control valve 110 also located within the outlet conduit 104. An outlet 112 is connected to conduit 64 by a normally open valve 113 to provide power backwash from pump 102. There is provided a backwash conduit 114 having a normally closed valve 116 and a flow control valve 118. The pump 102 is adapted to control the level of filtrate within tank 100 between vertically spaced levels 120, 122.

Figure 1:
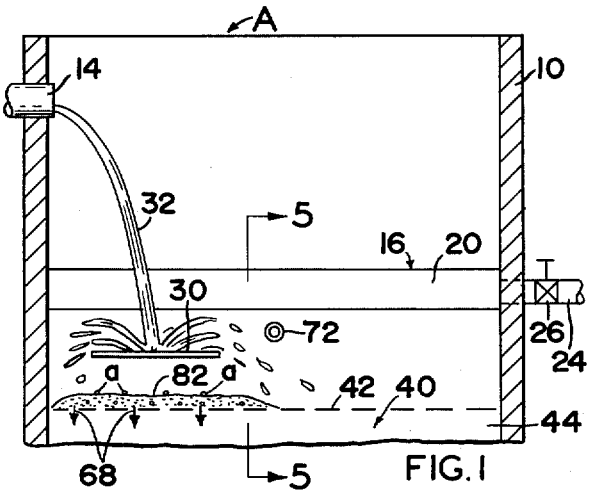
FIGS. 1–6 are schematic views illustrating the operating characteristics of the preferred embodiment of the present invention.
Figure 2:
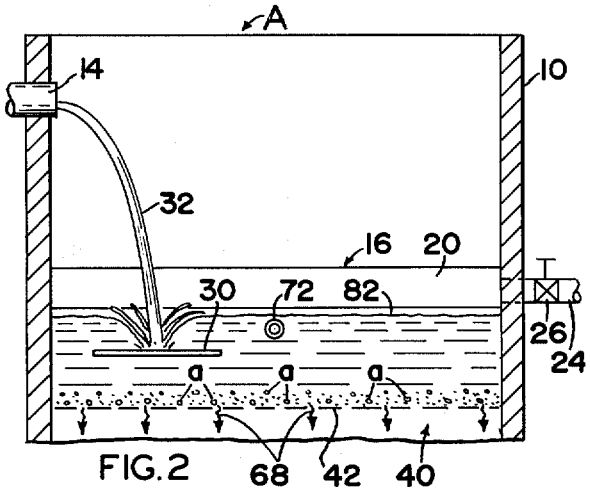

Referring now to the opposite side of cell A, as shown in FIG. 8, there is provided a backwash holding tank 130 which comes into play when valve 26 is open. This backwash holding tank includes a pump 132 having an outlet line 134 selectively connected with outlet conduits 136, 138 by valves 140, 142, respectively. The conduits 136, [168] *138* are directed to various holding sources for receiving the effluent from the holding tank at a rate determined, not by the backwash rate, but by the output rate of pump 132. The level of effluent within tank 130 is designated 144. In operation, waste effluent, represented by stream 32, enters the cell A through inlet 14 and falls by gravity to the splash plate 30. This abruptly changes the direction of the effluent and tends to break up the waste effluent and entrain air therein. Thereafter, the effluent falls by gravity to the upper surface 42 of quartz 44 where large particles a, shown in FIG. 1, are retained on the surface 42. These large particles, particularly in waste treatment plants of the aerobic spectrum, are flocculent materials being macroscopic in size. They cannot move through the filtering material 44. The flocculent material a tends to cover the entire surface 42, as shown in FIG. 2. This causes a substantial increase in the resistance for fluid flow along arrows 68 through the filtering media 44. Consequently, the [ effluent ] *effluent's* surface 82 will rise to overcome the added resistance caused by particles accumulating on surface 42.

Figure 3:
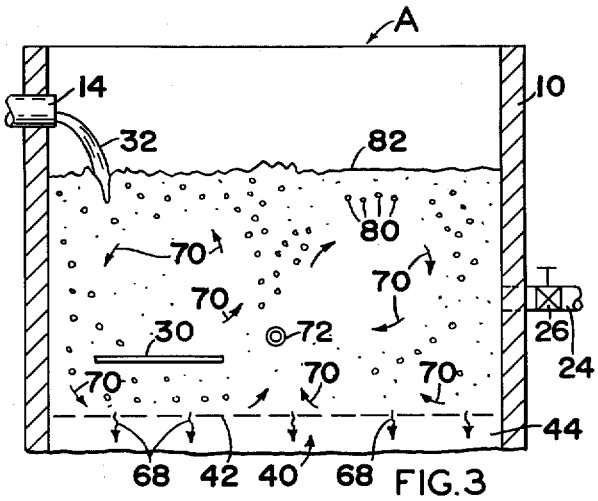

Effluent surface 82 continues to rise, as shown in FIG. 3, and at some predetermined level, over filter media 44 the air diffuser 72 commences the discharge of air into the effluent. This causes the section of effluent directly over the diffuser to become an admixture of air bubbles 80, waste effluent, and suspended solid particles of floc a. The specific gravity of this admixture is less than the specific gravity of the surrounding liquid and the incoming effluent because of the air entrained in the admixture. Consequently, the admixture moves upwardly since it is displaced by the more dense liquid previously mentioned. This constant displacement of a less dense admixture by the more dense liquid creates flow currents 70 in the filtering cell in directions generally indicated by these arrows. Compressed air supplied through diffuser 72 and inlet 74 may be manually or automatically applied according to the desires of an operator. The rotation of the admixture entrains the flocculent materials a that have come to rest on the upper surface 42. The rate of rotation or movement of the solid materials is a function of the velocity of the admixture. While this is taking place, finer suspended solids will continue to penetrate the filter media 44. This creates additional resistance so that the surface 82 of the effluent within tank 10 continues to rise. When the level reaches that shown in FIG. 5, the cell A is ready for backwash. The first step in backwashing the cell is to open valve 26 in outlet conduit 24. The liquid above the trough 16 is immediately drained by trough 16 to conduit 24 and into the holding tank or mud well 130, shown in FIG. 8.

Figure 4:
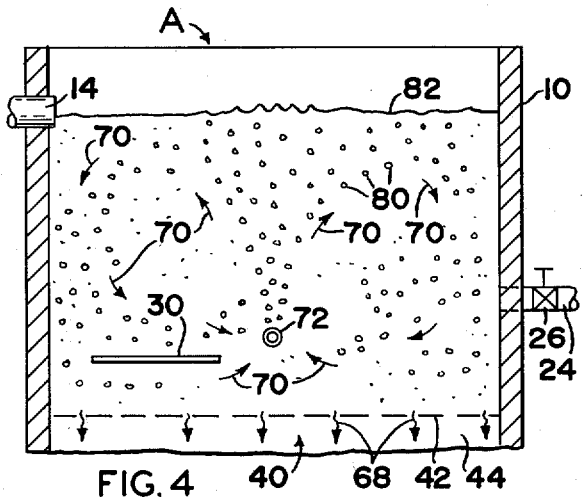
Figure 5:
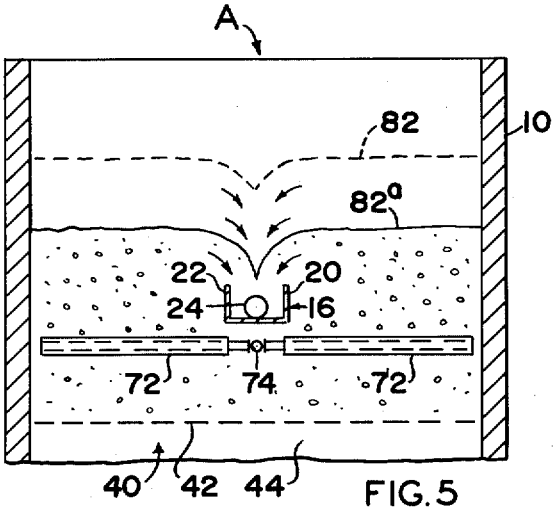
Figure 6:
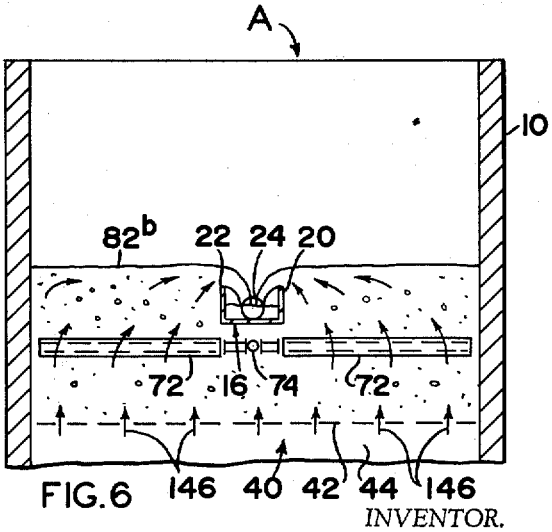

As the surface 82 goes downwardly to a positin 82b, as shown in FIG. 6, the filter media 44 is ready for backwashing. During the prior filtering operation, tank 100 was filled with a clear filtrate which passed through outlet 112. Valves 108, 113 are closed and valve 116 opened. The pump 102 then pumps the filtrate through conduit 64 into chamber 60. The filtrate then flows in a uniform direction indicated by the arrows 146 in FIG. 6 through the filtering element 40 and into the backwash trough 16. This process is continued until the washing action of the media 44 is completed. In practice, this requires approximately five minutes. Generally, the level of fluid within tank 100 is maintained at level 120. The pump 102 is energized when the filtrate reaches the upper level 122. The pump 102 operates alternately changing the filtrate level between 120, 122 until the effluent level 82 reaches its maximum upper limit as shown in FIG. 4.

As previously mentioned, when backwashing is required the liquid in cell A is drained through trough 16, in a manner previously described. During the backwashing, the filtrate passes upwardly from chamber 60 through the media 44 which expands the granular quartz 44 and carries the embedded fine particles in the quartz upwardly to the trough 16. From there, these particles are deposited in the holding tank 130. During this backwashing, valve 76 may be closed so that further agitation of the upper effluent does not take place as the effluent flows, by laminar flow, to the trough 16.

This action raises the level 144 of the admixture within tank 130; therefore, pump 132 is actuated. The backwashing rate is a function of the size of particles forming the media 44. This is often as high as fifteen times the downwardly filtering rate and may be substantially higher. This backwash rate creates a large voltage of liquid flow into trough 16, and it should not be directed into subsequent treatment plants at this high backwash rate. This high flow rate would upset the normal flow patterns of conventional waste treatment plants. The holding tank 130 can accept the admixture at the backwash rate, and pump 132 provides a controlled, lower rate for pumping the admixture to drying beds, sludge holding tanks, or further processing equipment through the conduits 136, 138. Pump 132 continues to operate until the admixture within tank 130 is reduced to a sufficiently low level for subsequent backwashing action. Pump 102 continues to force filtrate through the filter media 44 until the backwash is completed, which may be controlled manually, automatically or by the limitation of the volume of filtrate within the tank 100. This completes the general operation of the preferred embodiment of the invention illustrated in FIGS. 1–6, 8 and 14.

Figure 7:
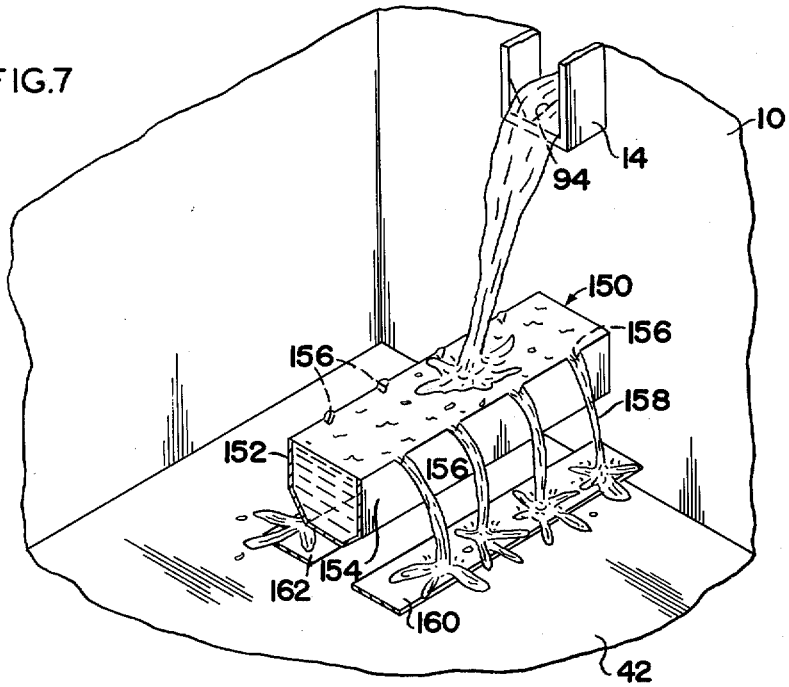
FIG. 7 is an enlarged pictorial view illustrating a modification of the invention as illustrated in FIGS. 1–6.

Referring now to FIG. 7, a modification of the present invention as illustrated, wherein the backwash trough 150 is generally U-shaped in cross section and includes transversely spaced side walls 152, 154. The side walls are provided with axially spaced notches or weirs 156. The inlet 14 is positioned directly opposite the trough 150 so that effluent from the inlet is received by the trough. The effluent then forms streams 158 which impinge against lower splash plates 160, 162 for purposes of aerating the effluent before it reaches the upper surface 42 of the filter elements 40. In this manner, the smaller streams of effluent are impinged against the splash plate to provide a more pronounced aeration of the incoming effluent. The notches 156 provide [s] a uniform flow into the trough 150 during backwash. In all other respects, the trough 150 functions in a manner similar to trough 16, as shown in FIG. 8. The side walls 152, 154 may be separate and adjustable so that they may be leveled after installation. The trough 150 also distributes the incoming effluent over the length of cell A. In all other respects trough 150 functions as trough 16 in FIG. 8. The weirs 156 have another distinct advantage. The admixture flowing into the trough through these weirs has an increased velocity which will pull larger objects into the trough for disposal.

Figure 9:
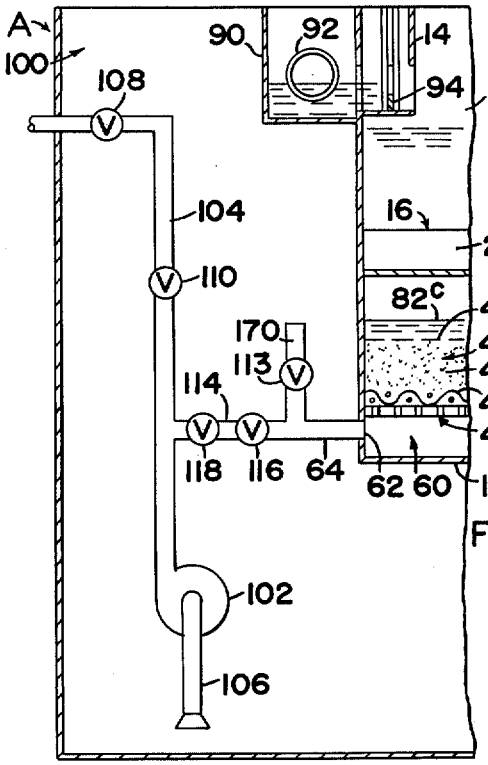
FIGS. 9–12 are partial, side elevational views showing, in cross section certain further modifications of the present invention.
Figure 10:
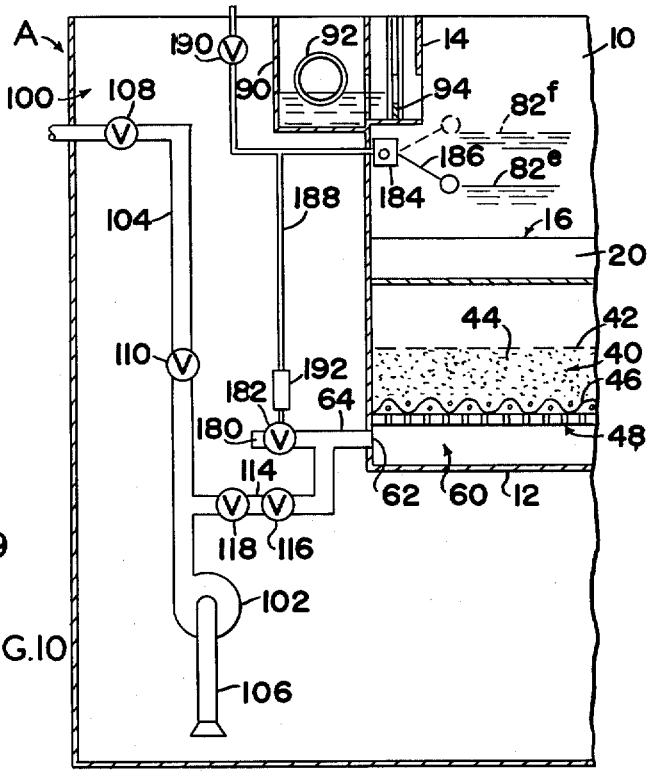

Referring now to FIG. 9, a modification of the preferred embodiment of the invention is illustrated. In this modification, a minimum effluent level 82c is maintained within the tank by providing a standpipe 170 extending upwardly from conduit 64. When valve 113 is open, the level of effluent within tank 10 will not decrease below level [s] 82c. In this manner, the surface 42 remains under liquid during the filtering cycle. A further modification of the present invention is illustrated in FIG. 10 wherein the upper level of the effluent within tank 10 varies between a lower limit of 82e and an upper limit of 82f. This maintenance of a relatively high upper level for the effluent allows additional time for aeration of effluent, especially oxygen deficient effluent. The level is maintained by an outlet 180 having a control valve 182 operated in response to a tank mounted control 184 having a control float 186. An air line, or other motivating line, 188 having a control device or valve 190 is utilized for actuating operator 192 for valve 182.

Figure 11:
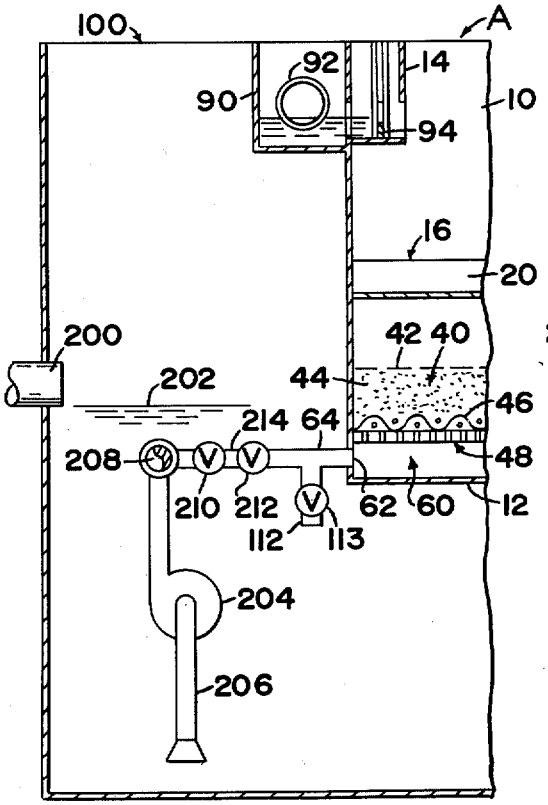
Figure 12:
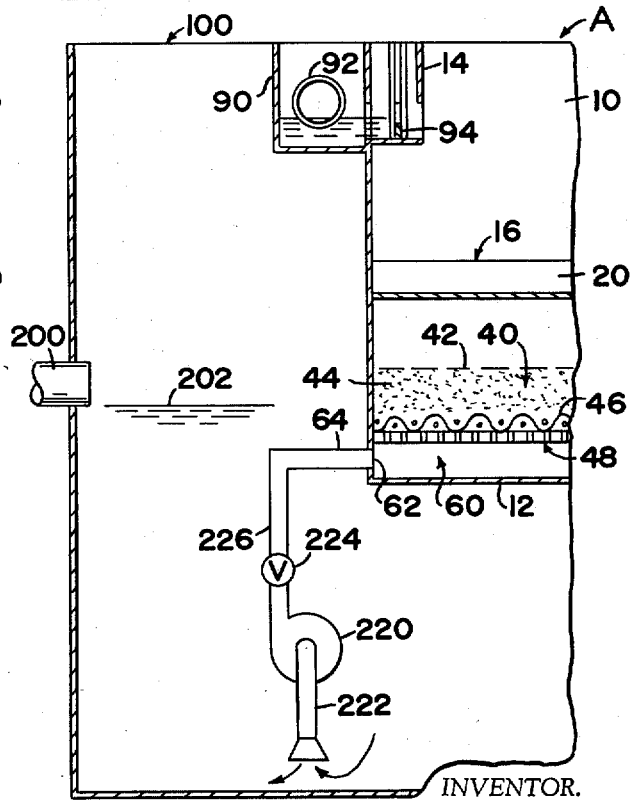

A further modification of the present invention is illustrated in FIG. 11 wherein the outlet 200 directs filtrate from tank 100 to maintain an upper level 202. Below the upper level is provided a pump 204 having an inlet 206 and an outlet manifold 208. This manifold is connected to a plurality of cells A which may be selectively operated by proper valving. If a particular cell is not in use, the inlet 14 may be blocked off, by any appropriate structure. This feature is appropriate for the various embodiments of the invention. It is particularly useful when a number of cells are used with the connecting manifold 208. Manifold 208 is connected to a flow control valve 210 and a normally closed valve 212 with a conduit 214. If a single cell A is used, manifold 208 is eliminated. During backwashing of the filter element 40, pump 204 is activated. Otherwise, the device is gravity operated so that filtrate leaves tank 100 by gravity through conduit 200. A similar gravity device is illustrated in FIG. 12. A pump 220 is provided below upper level 202 and has a depending conduit 222, which may be an inlet or an outlet, and a valve 224 within conduit 226. The valve is a flow control valve to limit the rate of the filtrate being pumped into the filter element during backwashing. The arrows at conduit 222 indicate that filtrate flow may be from the conduit during filtering and to the conduit during backwashing.

Figure 13:
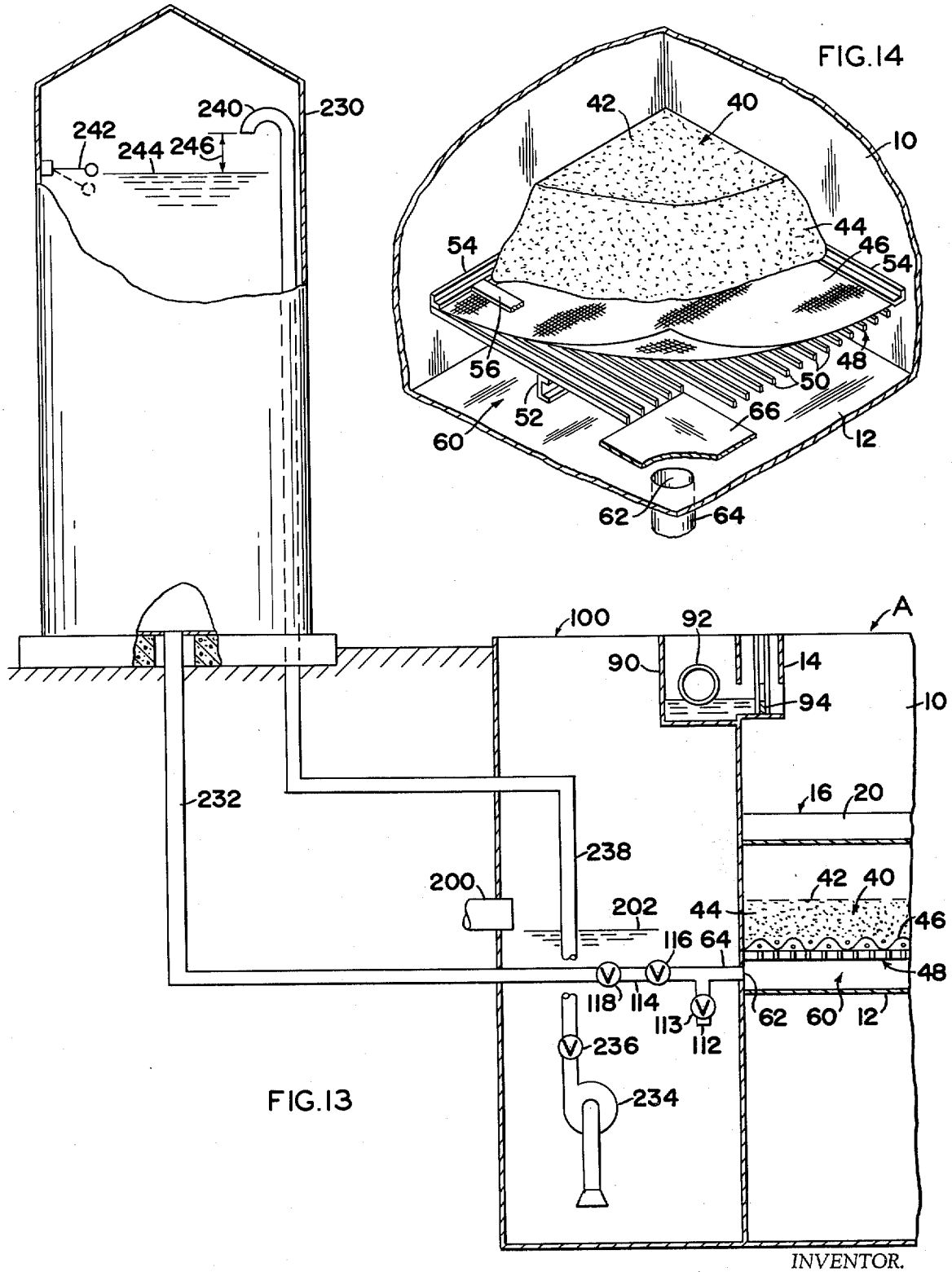
FIG. 13 is a side elevational view showing, somewhat schematically, still a further modification of the present invention.

FIG. 13 illustrates an embodiment of the present invention which is particularly useful where electrical power is limited or may be interrupted when backwashing of the filtering cells A is required. This embodiment includes a holding tower 230 mounted above the filter cell A. A supply conduit 232 is communicated with backwash conduit 114, and a pump 234 is connected to control valve 236 with a supply line 238. The supply line has an upper outlet 240 within the holding tower for discharging filtrate into the tower for subsequent use in backwashing. A float control 242 maintains the level 244 of the liquid within the tower at a predetermined upper limit. This upper limit provides a gap 246 between the outlet 240 and level 244 so that back draining of the liquid from the tower into the pump 234 is prevented. The pump control 242 energizes pump 234 until the proper level is obtained in the tower. At that time, the pump is turned off. Filtrate is discharged to outlet 200 from tank 100 by gravity, as previously explained. During the backwashing, normally closed valve 116 is open, normally open valve 113 is closed, and the liquid within tower 230 flows through conduit 64 for backwashing filter element 40, as previously explained. It is appreciated that tower 230 may be filled by clear liquid from sources other than tank 100. For instance, clear water could be stored within the tower to backwash filter element 40.

Figure 15:
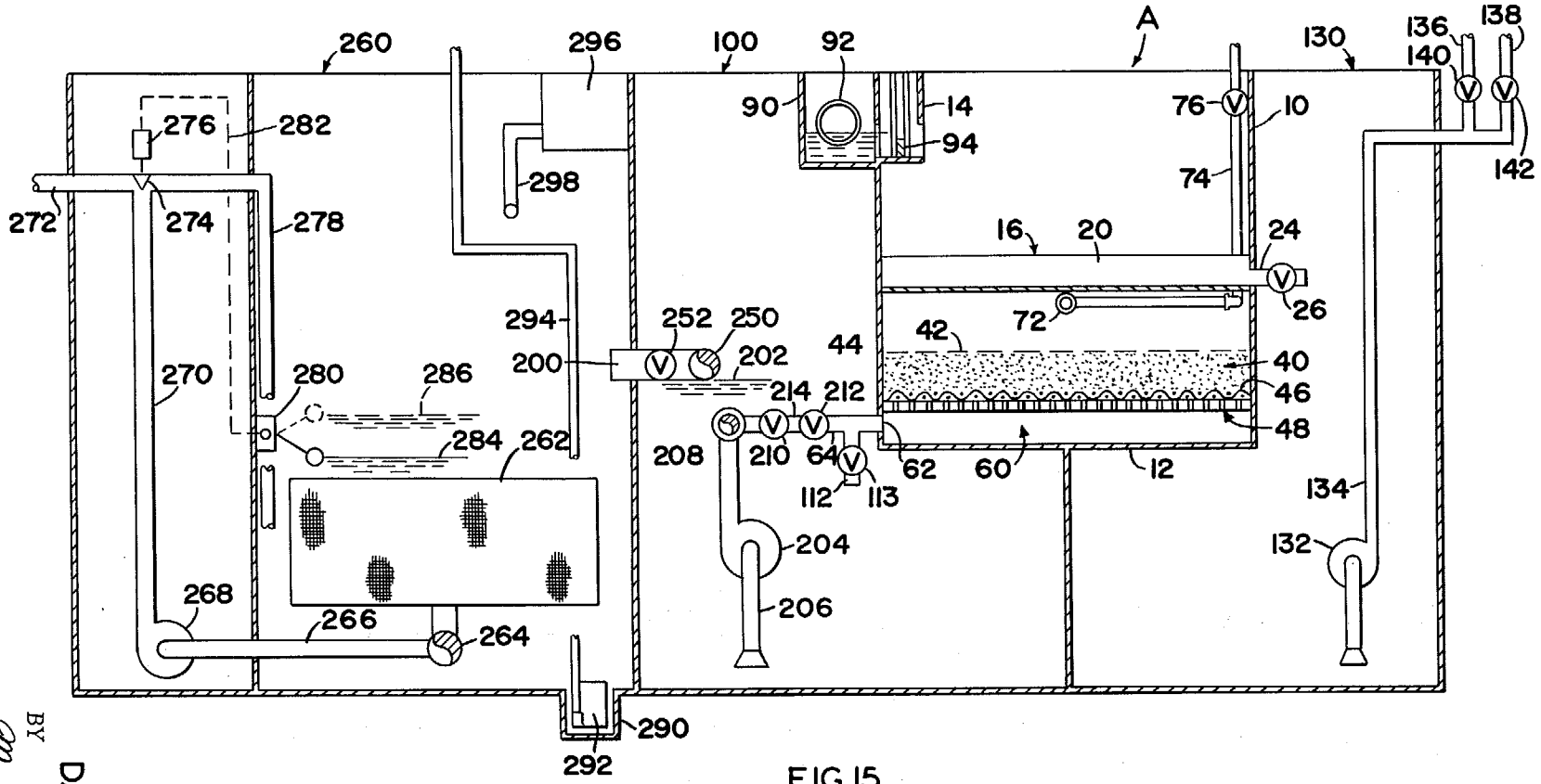
FIGS. 15 and 16 are side elevational views showing, somewhat schematically, still further modifications of the present invention.

Frequently the waste effluent being filtered in cell A must have all suspended particles removed, even the most minute size particles, such as bacteria which are generally in the range of 1–4 microns. Conventional filters capable of removing such small sized particles will clog so rapidly that their application is impractical. In FIG. 15, the basic filter unit, as shown in FIG. 11, is utilized by providing a manifold 208 for connecting, by appropriate valving, various parallel arranged cells A. A manifold 250 communicates with a plurality of outlets 200 for a single tank 100. A valve 252 is provided on each of the outlets 200 so that tank 100 may be communicated with one of several diatomaceous earth filter tanks 260, only one of which is shown. Tank 260 includes a plurality of hollow filter elements 262 which are connected by an appropriate manifold 264. The manifold is, in turn, communicated with a conduit 266 so that the interior of the filter elements may be evacuated by a common pump [168] *268.* In this manner, liquid within tank 260 passes through the surface of filter element 262 and is forced upwardly through conduit 270 to an outlet 272. The outlet is communicated with an appropriate stream or another repository for filtrate. A selectively actuated valve element 274, controlled by an operator 276, communicates conduit 270 with either the outlet 272 or a recirculating conduit 278 which is directed back into the tank 260. A control unit 280 which includes a float actuated, liquid level sensing device is utilized to control the operator 276 through a control device, such as electrical line 282. In this manner, the level of liquid within tank 260 is maintained between a minimum level 284 and a maximum level 286.

In operation, liquid enters one or more of the tanks 260 through the particular outlets 200 in which the valve 252 is opened. Referring again to a single tank 260, an initial load of diatomaceous earth is placed into tank 260 and valve element 274 is moved to connect conduit 270 with recirculating conduit 278. Pump 268 is then engerized to recirculate fluid through the hollow filter element or elements 262. This recirculation of the fluid coats the outer surface of the various filter elements 262 with the diatomaceous earth for subsequent filtering of small particles. Commercial grades of diatomaceous earth, depending upon the quality, can remove particles down to 0.2 micron in size. This is substantially below the general size of bacteria, which is 1 to 4 microns. Consequently, the surfaces of filter element 262 can remove even the smallest particles from the previously filtered liquid entering the tank 260. When the level of liquid reaches the maximum 286, control 280 actuates the operator 276 which causes valve element 274 to communicate conduit 270 with outlet 272. Filtrate is then discharged from the filtering installation.

Tank 260 is provided with a lower sump 290 having a pump 292 connected with a discharge conduit 294. When the head loss across pump 268 is increased to a preselected point, pump 268 is de-energized, and the vacuum within the filtered element is lost. The diatomaceous material and entrapped solids then fall from the surfaces of filtering elements 262 and are accumulated in sump 290 where they are discharged by the pump 292. To provide extended filter runs, additional diatomaceous earth is fed periodically and/or automatically into tank 260 from a diatomaceous earth feeder 296 through a feed conduit 298. The recoating process is repeated after each washing period, and again the diatomaceous earth enters tank 260 through conduit 298 or may be charged manually into the tank. This modification of the present invention provides for elimination of even the smallest particles from the liquid before it is discharged into a stream. Consequently, the discharge fluid is substantially clear of all suspended impurities and can be used for various purposes.

An effluent passing through the filter media 44 having an effective size of 0.7 mm. is well prepared for passage through filter element 262. Such filtrate will generally have less than 10 parts per million suspended solids, thus insuring economical runs of the diatomaceous earth fillers. This suspended solid content will permit approximately 50,000 pounds of liquid to pass through each square foot of element 262 before plugging the diatomaceous filters. This filter capacity may be increased by additional diatomaceous earth from feeder 296.

Figure 16:
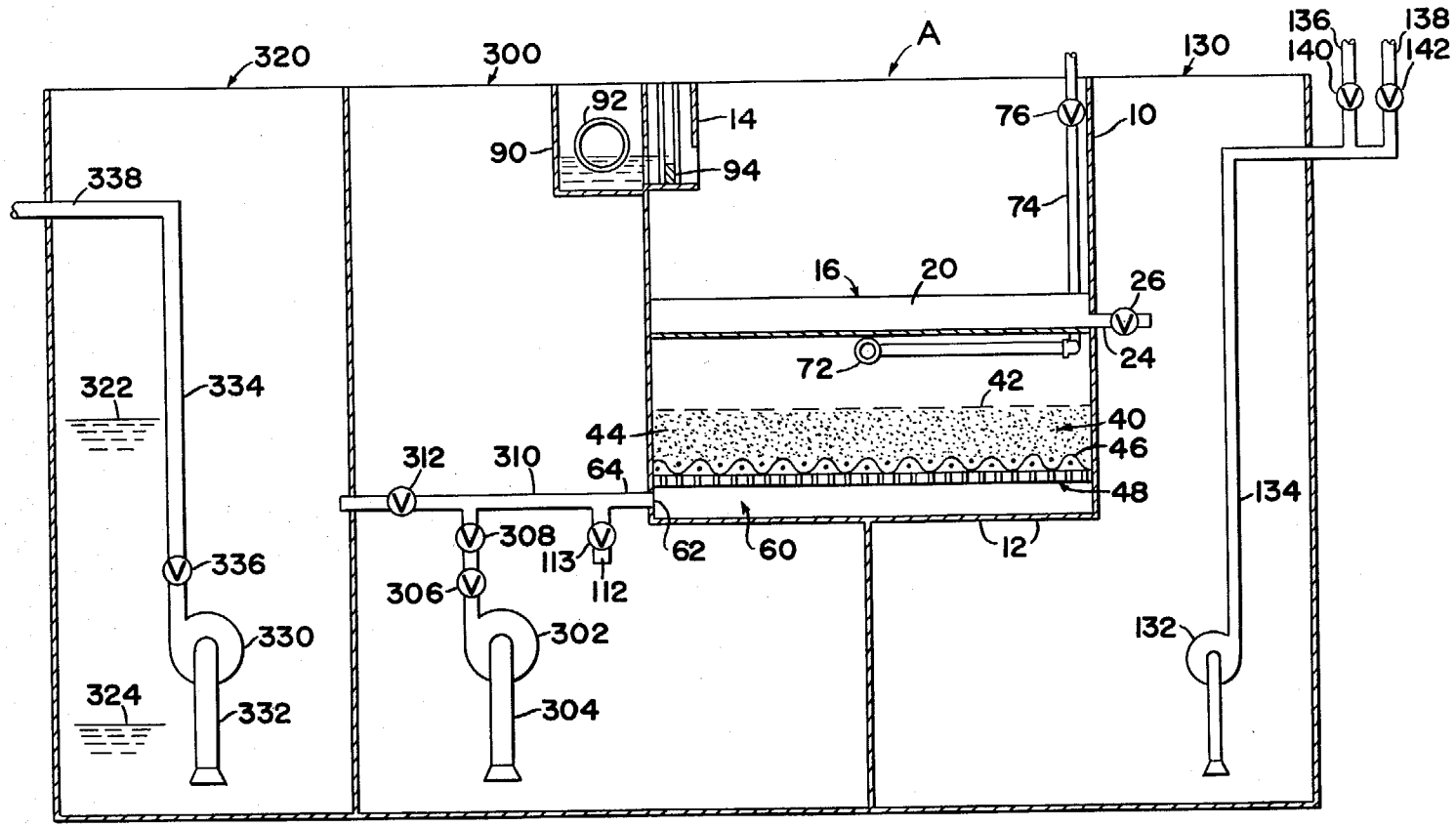

In some instances, it is desirable to provide a filtering media 44 which will provide for deionization of waste effluent. FIG. 16 illustrates a modification of the present invention which is adapted for this purpose. The filtering media is an ion exchange resin, and outlet 112 is directed toward a discharge or recharging tank 300. This tank includes a pump 302 having an inlet 304, the discharge of which flows through a normally closed valve 306, a flow control valve 308 into conduit 310. The filtrate is then discharged through a discharge valve 312 into a clear fluid tank 320. Fluid is maintained within this clear fluid tank between levels [ 322 ] *332*, 324 by a pump 330 having a lower inlet 322 and an outlet conduit 334. The outlet conduit includes a valve 336 and an outlet 338 communicated with an appropriate stream or other depository.

In operation, effluent flows through the ion exchange resin 44 wherein the effluent is deionized. This deionized effluent then flows, as a filtrate, to clear fluid tank 320 which functions similarly to tank 100 of the other embodiments. Valves 113 and 306 are closed. In the clear fluid tank 320, the filtrate rises to level 322. Pump 330 is then actuated to reduce the level of fluid to 324. This discharges the filtrate through outlet 338 into the appropriate depository. After a given time, the ion exchange capacity of the resin forming media 44 becomes exhausted. When this happens, the recharging tank 300 is filled with recharging chemicals which are determined by the characteristics of the resin being used in the filter 40. The backwash cycle is then started. Valve 312 is closed, valve 113 is closed, and valve 306 is opened. Pump 302 then forces the recharging chemicals through conduit 310 and conduit 64 into the chamber 60 where it passes upwardly through the filtering element 40. The backwash liquid then flows into the holding tank or mud well 130 where it is collected and ultimately discharged.

In all the embodiments of the invenetion, chlorine or other halogen may be applied to filtrate in the clear fluid tank to prevent a slime covering due to bacteria action or other causes. The use of a halogen in the backwash liquid held within the clear fluid tanks has the added advantage of providing a safe uniform sterilization of the filter media 44 during the backwash cycle. When a halogen is used with the filtrate for backwashing, the admixture in holding tank 130 may be discharged directly to drying beds or other solid concentrating devices without further treatment.

It is appreciated that when the media 44 has a relatively large uniform grain size, such as 0.7 mm., it may be desirable to provide a second filtering cell A in series with the first mentioned cell and having a media 44 with a small particulate size, such as 0.35 mm.–0.40 mm. This provides the added advantage of removing small particles, such as bacteria without using the diatomaceous earth filter as illustrated in FIG. 15.

The present invention has been described in connection with certain structural embodiments; however, these embodiments may be modified without departing from the intended spirit and scope of the present invention and as defined in the appended claims.

Having thus described my invention, I claim:

1. [In an apparatus for removing solids from waste effluent having small particles and large particles, said apparatus include a particle filtering element having relatively small passages for blocking flow of said particles therethrough, said element having an upper surface, a lower discharge means below said element, said large particles tending to accumulate on said surface, an upper inlet for said effluent, and a lower discharge port communicated with said means to remove filtrate, the improvement comprising: means to maintain a body of effluent above said surface and mechanical means above said surface positioned to create positive currents in said effluent which currents sweep over said surface and lift said large particles from said surface during the filtering action.]

2. [The improvement as defined in claim 1 wherein said filtering element includes a layer of particulate media.]

3. [An apparatus as defined in claim 1 wherein said mechanical means comprises a diffuser means for creating fine air bubbles above said surface and in said effluent.]

4. [A method for removing solids from waste effluent, having small and large particles, said method comprising the steps of:

a. providing a particulate filter bed with an upper surface and adapted to block flow of said large particles;

b. developing a body of said effluent above said surface; and, c. mechanically creating positive currents which sweep over said surface while said effluent is being filtered for lifting said large particles from said surface.]

5. An apparatus for removing solids from waste effluent containing particulate matter, said apparatus comprising: a filter bed including granular material and having an upper surface; and effluent inlet above said upper surface; a filtrate outlet generally below said bed; and an impingement member above said surface and aligned with said inlet for intercepting and dispersing a stream of incoming effluent to lessen erosion of said bed by said stream, said member including a side wall with an upper edge generally parallel with said upper surface and a plurality of notches spaced along said edge to define outlets for said incoming effluent, and a plate mounted directly over said surface and below said edge positioned to intercept effluent flowing from said notches.

6. An apparatus for removing solids from waste effluent containing particulate matter, said apparatus comprising: a main tank having a bottom, side walls and a top; a filter bed adjacent to the bottom of said main tank and including granular material and having an upper surface; an effluent inlet in said main tank and above said upper surface; a filtrate outlet in said main tank generally below said surface; a backwash conduit in said main tank and above said surface, and a trough extending into said main tank and above said surface, said conduit communicated with said trough; and, said trough having at least one side wall with an upper edge generally parallel to said surface, notches in said side wall and intercepting said edge to provide high velocity inlets to said trough during backwash liquid flow into said trough, and said effluent inlet being aligned vertically with said trough and including a cut off valve means in said conduit, and a splash plate adjacent said upper surface, said edge of said trough being vertically above said splash plate whereby effluent flows from said trough onto said splash plate.

7. [In an apparatus for removing solids from waste effluent containing particulate matter, said apparatus comprising: a filter bed including granular material and having an upper surface; an effluent inlet above said upper surface; a filtrate outlet generally below said bed; a discharge tank; and a discharge conduit communicating said tank and said outlet, the improvement comprising: pump means in said conduit with a pump means inlet below said effluent inlet whereby effluent can flow by gravity through said filter, said pump means and out said pump means inlet, said pump means having a de-energized first condition in which filtrate can flow through both said conduit and said pump means into said tank and an energized second condition in which filtrate is forced from said tank, through said pump means, through said conduit and through said bed; and means for selectively changing said pump means between said first and second conditions.]

8. [The improvement defined in claim 7 wherein said pump means comprises a pump having a pump inlet and a pump outlet communicated through said pump, said pump inlet being said pump means inlet, said pump inlet and pump outlet receiving flow of filtrate when said pump means is in either of said conditions.]

9. [An apparatus for removing solids from waste effluent comprising: a filter tank having a lower wall; a support element covering said lower wall and spaced upwardly therefrom to define a lower chamber; a fine mesh filter element secured onto said support element and having openings of a given size; a layer of particulate filter media covering said fine mesh filtering element and having an upper surface; said media having a grain size at least slightly larger than the size of said openings in said filter element; an effluent inlet above the surface of said media layer; an outlet port in said chamber; a clear fluid tank; a conduit between said clear fluid tank and said outlet port whereby clear fluid from said chamber flows into said clear tank during the filter cycle of said apparatus; flow through pump means connected to said conduit and having a pump inlet located below effluent inlet whereby fluid flows through said conduit, through said pump means and out said pump inlet into said clear fluid tank and means responsive to activation of said pump means for forcing fluid from said clear fluid tank through said pump means, into said chamber, and through said filter media.]

*10. In an apparatus for removing solids from waste effluent having small particles and large particles, said apparatus include a particle filtering element having relatively small passages for blocking flow of said particles therethrough, said element having an upper surface, a lower discharge means below said element, said large particles tending to accumulate on said surface, an upper inlet for said effluent, and a lower discharge port communicated with said means to remove filtrate, the improvement comprising: means to maintain a body of effluent above said surface and mechanical means above said surface for creating a volume of reduced specific gravity within said body of effluent, said mechanical means being positioned to create generally non-destructive positive lifting currents in said effluent caused by the continuous displacement of said volume of reduced specific gravity with effluent in said body, which displacement induced currents sweep over said surface and lift said large particles from said surface during the filtering action, said mechanical means comprising an air diffuser means extending over said surface for creating fine air bubbles above said surface and in said effluent whereby said currents are caused externally of said mechanical means.*

*11. The improvement as defined in claim 10 wherein said diffuser means is an air diffuser including an elongated tube extending over said surface and openings in said tube for forming said air bubbles.*

*12. A method for removing solids from waste effluent, having small and large particles, said method comprising the steps of:*

*a. providing a particulate filter bed with an upper sur-*

*face and adapted to block flow of said large particles;*

*b. developing a body of said effluent above said surface;*

*c. providing an air diffuser extending above said surface to form air bubbles in said body of effluent above said diffuser, said air bubbles creating a volume of reduced specific gravity in said body, said volume being continuously displaced with effluent in said body; and,*

*d. mechanically creating generally non-destructive positive currents in said body of effluent by said continuous displacement which currents sweep over said surface while said effluent is being filtered for lifting said large particles from said surface.*

*13. A method for removing solids from waste sewage effluent having small and large particles, said method comprising the steps of:*

*a. providing a particulate filter bed with an upper surface and adapted to block flow of said large particles;*

*b. developing a body of said effluent above said surface; and,*

*c. mechanically creating an admixture of air and effluent in said body and over said surface by a diffuser extending adjacent said upper surface, which admixture has a lower specific gravity than said effluent forming said body whereby said admixture rises in said body of effluent and creates positive currents which sweep over said surface while said effluent is being filtered for lifting said large particles from said surface.*

* * * * *